(12) United States Patent
Kimura et al.

(10) Patent No.: US 6,714,005 B2
(45) Date of Patent: Mar. 30, 2004

(54) NON-CONTACT TYPE DISPLACEMENT SENSOR APPARATUS

(75) Inventors: Masahiro Kimura, Chiryu (JP); Keiji Yasuda, Handa (JP); Kiyohiro Fukaya, Takahama (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 47 days.

(21) Appl. No.: 10/102,741

(22) Filed: Mar. 22, 2002

(65) Prior Publication Data

US 2002/0135497 A1 Sep. 26, 2002

(30) Foreign Application Priority Data

Mar. 23, 2001  (JP) ........................................ 2001-084262

(51) Int. Cl.⁷ ............................. G01B 7/30; F16C 3/00
(52) U.S. Cl. ............................. 324/207.22; 324/207.2; 324/207.25
(58) Field of Search ...................... 324/207.25, 207.22, 324/207.21, 207.2

(56) References Cited

U.S. PATENT DOCUMENTS 5,252,919 A     10/1993   Uemura
5,789,917 A  *  8/1998    Oudet et al. ........... 324/207.25
2001/0015642 A1  8/2001   Fischer et al.

FOREIGN PATENT DOCUMENTS

| DE | 43 17 259 A1 | 5/1993 |
| DE | 100 07 968 C1 | 2/2000 |
| JP | 2-12205 | 11/1988 |
| JP | 8-68606 | 8/1994 |
| JP | 2001-264110 | 2/2001 |

OTHER PUBLICATIONS

Office Action dated Apr. 11, 2003, from the German Patent Office with English translation.

* cited by examiner

Primary Examiner—Walter E. Snow
(74) Attorney, Agent, or Firm—Reed Smith LLP; Stanley P. Fisher, Esq.; Juan Carlos A. Marquez, Esq.

(57) ABSTRACT

A non-contact type displacement sensor is provided with a housing, a rotational shaft being in an approximately cylindrical hollow shape, a magnetic circuit forming member disposed in an inner space of the rotational shaft, and a magnetic sensing element supported by a housing so as to be positioned on a central axis of the rotational shaft in a space enclosed by the magnetic circuit forming member, wherein the magnetic sensing element is not displaced.

11 Claims, 7 Drawing Sheets

US 6,714,005 B2

NON-CONTACT TYPE DISPLACEMENT SENSOR APPARATUS

CROSS REFERENCE TO RELATED APPLICATIONS

This application is based on and claims priority under 35 U.S.C. §119 with respect to a Japanese Patent Application 2001-084262, filed on Mar. 23, 2001, the entire content of which is incorporated herein by reference.

FIELD OF THE INVENTION

This invention generally relates to a displacement sensor or a displacement sensor structure. More particularly, this invention pertains to a non-contact type displacement sensor structure or an angle displacement sensor structure. Further, this invention relates to a displacement sensor preferably applied to an accelerator pedal sensor.

BACKGROUND OF THE INVENTION

Various sensor structures have been known already. A non-contact type displacement sensor for detecting a displacement of angle by using a hall element or a magnetic resistor is disclosed, for example, Japanese Patent Laid-Open Publications No. 8 (1996)-68606 and 2 (1990)-122205.

Referring to FIG. 9, a sensor body 22 disclosed in the former Japanese Patent Laid-Open Publication No. 8 (1996)-68606 is formed of a housing 21 having an IC containing portion 241 containing a hall element and a casing 13 for supporting an input shaft 14. The input shaft 14 is connected to a rotational member 15 for supporting magnets 171, 172 and a yoke 16. The magnets 171, 172 form a magnetic field interacting with the hall element. The input shaft 14 and the rotational member 15 are completely independent members from each other. The rotational member 15 is connected to the input shaft 14 as an external connecting member. Therefore, the magnets 171, 172 and the yoke 16 supported by the rotational member 15 are also completely independent members which are present outside the input shaft 14. The yoke 16 to which the magnets 171, 172 are attached is secured to the rotational member 15 by means of a screw.

A peninsular portion 211 including the IC containing portion 241 is formed in the housing 21 so as to intersect with the parallel magnetic field produced by the magnets 171, 172. In such a case, the hall element (the magnetic sensing element) is required to be accurately located at a position in which the distortion of the magnetic field can be reduced as much as possible, i.e., at a position on a central axis of the input shaft 14, so as to detect the magnetic field with a high level of accuracy.

Referring to FIG. 10, according to the sensor disclosed in the latter Japanese Patent Laid-Open Publication No. 2(1990)-122205, a rotational shaft 2 having a small diameter is provided with a large diameter portion having a diameter nearly twice as large as the rotational shaft 2 at a tip end portion thereof. The large diameter portion is employed as a magnetic holder 22 in which permanent magnets 3A, 3B are disposed. A hall element 5 (a magnetic sensing element) is disposed in a cylindrical space which is enclosed by the permanent magnets 3A, 3B and has approximately the same diameter as the diameter of the rotational shaft 2. The space in the rotational shaft 2 is in a filled structure (i.e., a solid structure) except for the space where the hall element 5 is disposed.

However, according to the former described sensor in which the yoke 16 is secured to the rotational member 15 by the screw, the rotational member 15 and the yoke 16 are required to be large-sized in order to assure a space for fixing them to each other. The size of the sensor main body 22 itself is hence increased, as well. This may lead to an increase of cost expended on each component. Further, the yoke 16 and the magnets 171, 172 are externally connected to an end portion of the input shaft 14 via the rotational member 15. Therefore, those components may be required to be large-sized in each width direction. The sensor main body 22 is hence required to be large-sized, as well.

As described above, the hall element (the magnetic sensing element) is required to be positioned on the central axis of the input shaft 14 and on a central position of the magnetic field having small distortion so as to detect the magnetic field with a high level of accuracy. However, the input shaft 14, the rotational member 15, the yoke 16 and the magnets 171, 172 exist and are assembled as members independent from one another. Therefore, position detecting of each component with a high level of accuracy may be difficult due to size fluctuation of each component or dimensional errors for assembly each component.

On the other hand, according to the latter described sensor, the housing 1 for supporting the rotational shaft 2 is required to include a complicated inner structure due to the small diameter of the rotational shaft 2. When the sensor is applied to an automotive vehicle or the like, vibration may occur affecting the accuracy of detection of a rotational angle of the magnetic field.

Further, the rotational shaft 2 is required to be light in weight and have a large surface area so as to perform a delicate control of the rotation of the rotational shaft 2 under a simple structure. However, the rotational shaft disclosed in the latter publication is the solid structure, which is not a hollow structure, and has the small diameter. Therefore, a mechanism for controlling the rotational shaft 2 may be required to be complicated. As illustrated in FIG. 10, there is a large unnecessary space in the sensor. The entire size of the housing of the sensor may become unnecessarily large.

Accordingly, the above disclosed sensors are still subject to certain improvements with respect to accurately determining a position of a magnetic sensing element in a magnetic field, a downsizing of the sensor, and providing a displacement sensor for performing a delicate control of a rotational shaft of the sensor under a simple structure.

SUMMARY OF THE INVENTION

According to the present invention, a non-contact type displacement sensor is provided with a housing, a rotational shaft being in an approximately cylindrical hollow shape, a magnetic circuit forming member disposed in an inner space of the rotational shaft, and a magnetic sensing element supported by a housing so as to be positioned on a central axis of the rotational shaft in a space enclosed by the magnetic circuit forming member, wherein the magnetic sensing element is not displaced.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE PRESENT INVENTION

Figure 1:
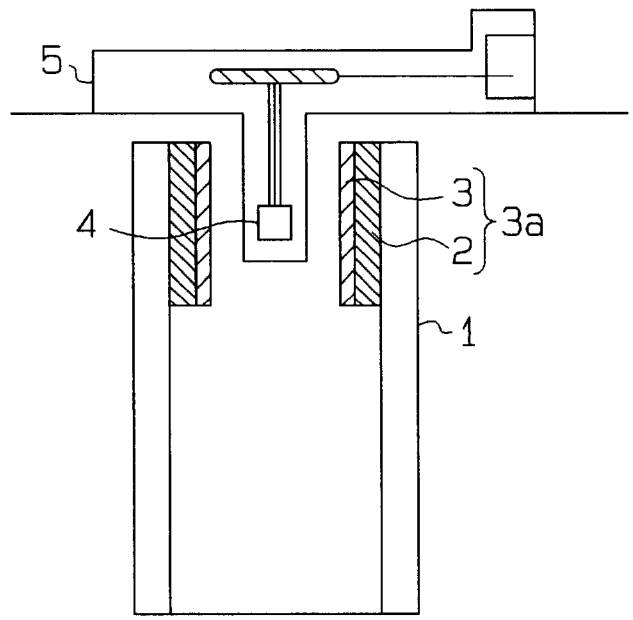
FIG. 1 is a substantially longitudinal cross-sectional view of a displacement sensor according to a first embodiment of the present invention.

According to a displacement sensor of a first embodiment of the present invention illustrated in FIG. 1, a rotational shaft 1 is in a hollow and nearly cylindrical shape. A magnet 3 and a yoke 2 for improving magnetic efficiency are supportively disposed at an end portion in a sensor housing 5 by a supporting means, for example, a stopper. The yoke 2 and the magnet 3 constitute a magnetic circuit forming member 3a, and form a magnetic field at one end portion of the rotational shaft 1. The magnetic circuit forming member 3a is disposed in the rotational shaft 1 so as to be disposed coaxially with the rotational shaft 1. A direction of the magnetic field is rotated in response to a rotation of the rotational shaft 1. The distortion of the magnetic field is generally large at its peripheral portion. Therefore, a hall element 4 (a magnetic sensing element) fixedly supported by the sensor housing 5 is located at a fixed central portion of the magnetic field, that is, on a central line of the rotational shaft 1 so as to detect the rotation of the magnetic field with a high level of accuracy. Further, the magnetic field is positioned in the rotational shaft 1. The hall element 4 is hence disposed in the rotational shaft 1. This structure can reduce the size of the sensor housing 5 in its thickness direction. Additionally, the yoke constituting the magnetic circuit forming member 3a can be formed integrally with the rotational shaft 1 by an integrally-molding method, a press-fitting method, or a adhering method.

Figure 2:
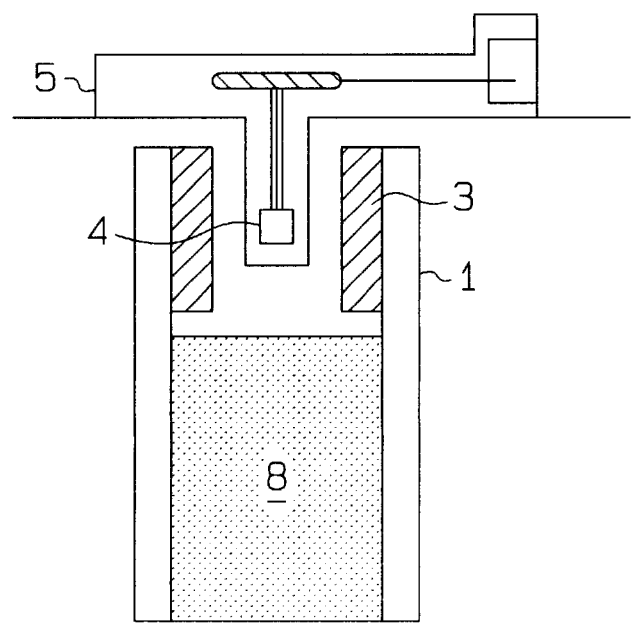
FIG. 2 is a substantially longitudinal cross-sectional view of a displacement sensor according to a second embodiment of the present invention.

According to a displacement sensor of a second embodiment of the present invention illustrated in FIG. 2, the displacement sensor according to the second embodiment is different from the displacement sensor according to the first embodiment with respect to that the rotational shaft 1 is made of soft magnetic material. The yoke 2 is not hence provided as an independent member as described in the first embodiment, but is integrally formed with the rotational shaft 1. Therefore, only the magnet 3 is provided in an inner space of the rotational shaft 1. Further, according to the second embodiment, a space 8 except for a space defined by the magnet 3 and the housing 5, i.e., a space 8 except for a space having the magnetic field is in a filled structure, i.e., a solid structure.

Figure 3:
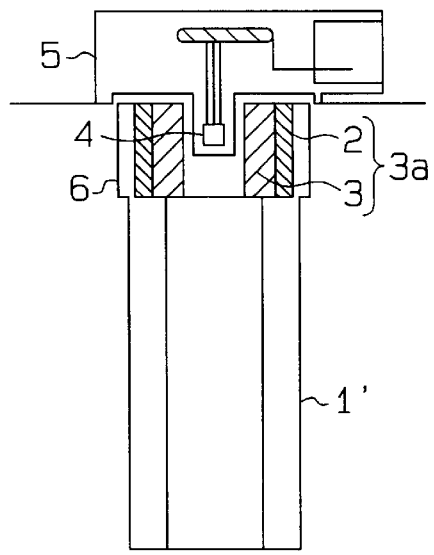
FIG. 3 is a substantially longitudinal cross-sectional view of a displacement sensor according to a third embodiment of the present invention.

According to a displacement sensor of a third embodiment of the present invention illustrated in FIG. 3, a stepped portion 6 having a large diameter is provided at the end portion in the housing 5 of an approximately cylindrical hollow rotational shaft 1'. Magnetic circuit forming members 2, 3 are disposed in the stepped portion 6. As illustrated in FIG. 3, an inner diameter of the stepped portion 6 (in this case, an outer diameter of the magnetic circuit forming member 2) is formed to be smaller than an outer diameter of the rotational shaft 1'.

Figure 4:
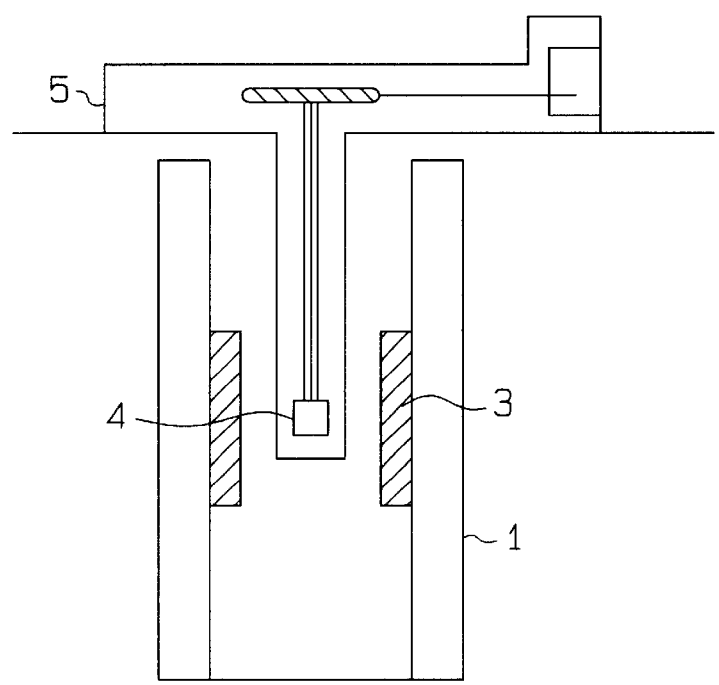
FIG. 4 is a substantially longitudinal cross-sectional view of a displacement sensor according to a fourth embodiment of the present invention.

According to a displacement sensor of a fourth embodiment of the present invention illustrated in FIG. 4, only the magnet 3 is provided along the rotational shaft 1 at an approximately central portion in an axial direction of the inner space of the rotational shaft 1 made of soft magnetic material. The hall element 4 is supported by the housing 5 so as not to be displaced, at an approximately central portion in the axial direction of the rotational shaft 1, i.e., at a center of the magnetic field. A change in a position of the hall element 4 relative to the center of the magnetic field due to vibration applied to the rotational shaft 1 can be hence restrained down to a minimum level. Therefore, even when the displacement sensor is employed in an automobile under a condition that vibration may be produced, a change in a rotational angle of the rotational shaft 1 can be detected with a higher level of accuracy.

Figure 5:
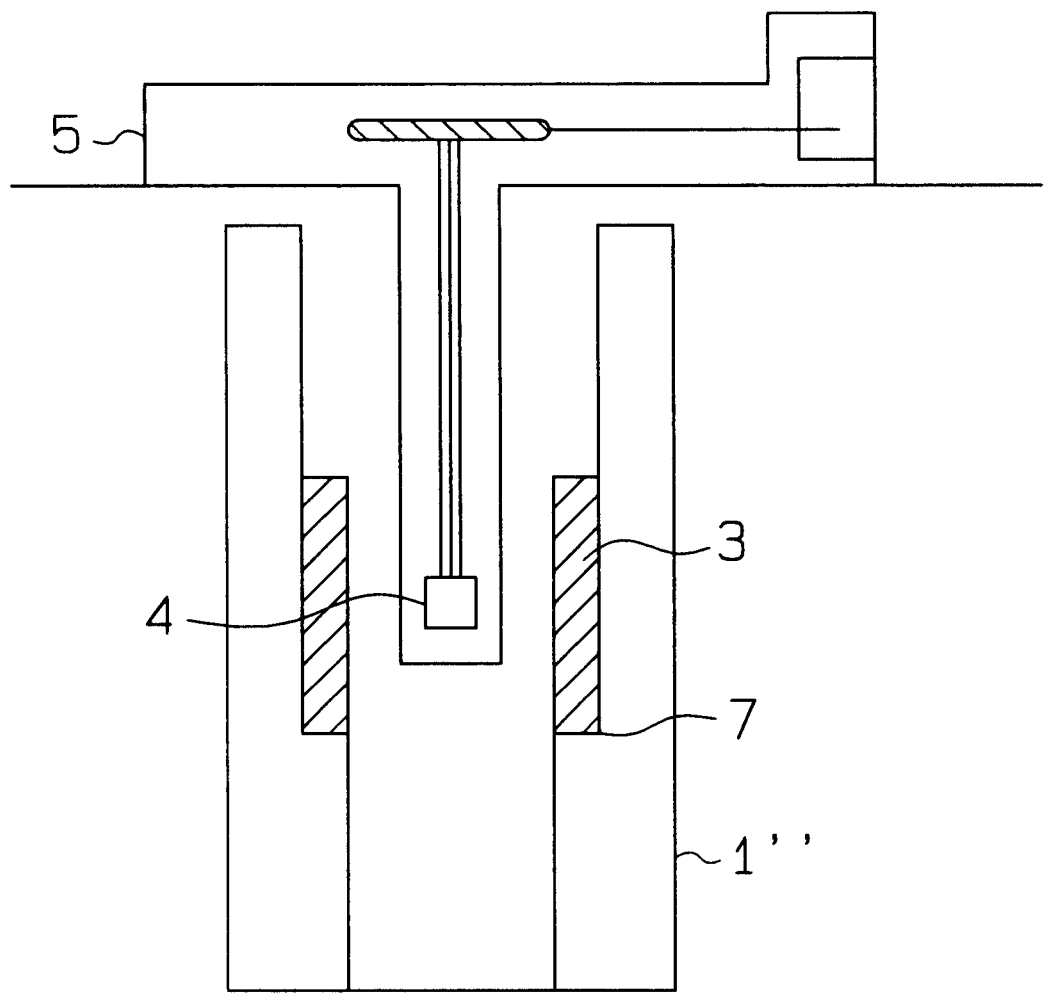
FIG. 5 is a substantially longitudinal cross-sectional view of a displacement sensor according to a fifth embodiment of the present invention.

According to a displacement sensor of a fifth embodiment of the present invention illustrated in FIG. 5, a shoulder portion 7 is provided along an approximately cylindrical hollow rotational shaft 1" at an approximately central portion in an axial direction thereof. The rotational shaft 1" with a large thickness is made of soft magnetic material. A magnet 3 is disposed at the shoulder portion 7. A hall element 4 is supported by a housing 5 so as not to be displaced at an approximately central portion in an axial direction of the rotational shaft 1", i.e., a center of magnetic field.

Figure 6:
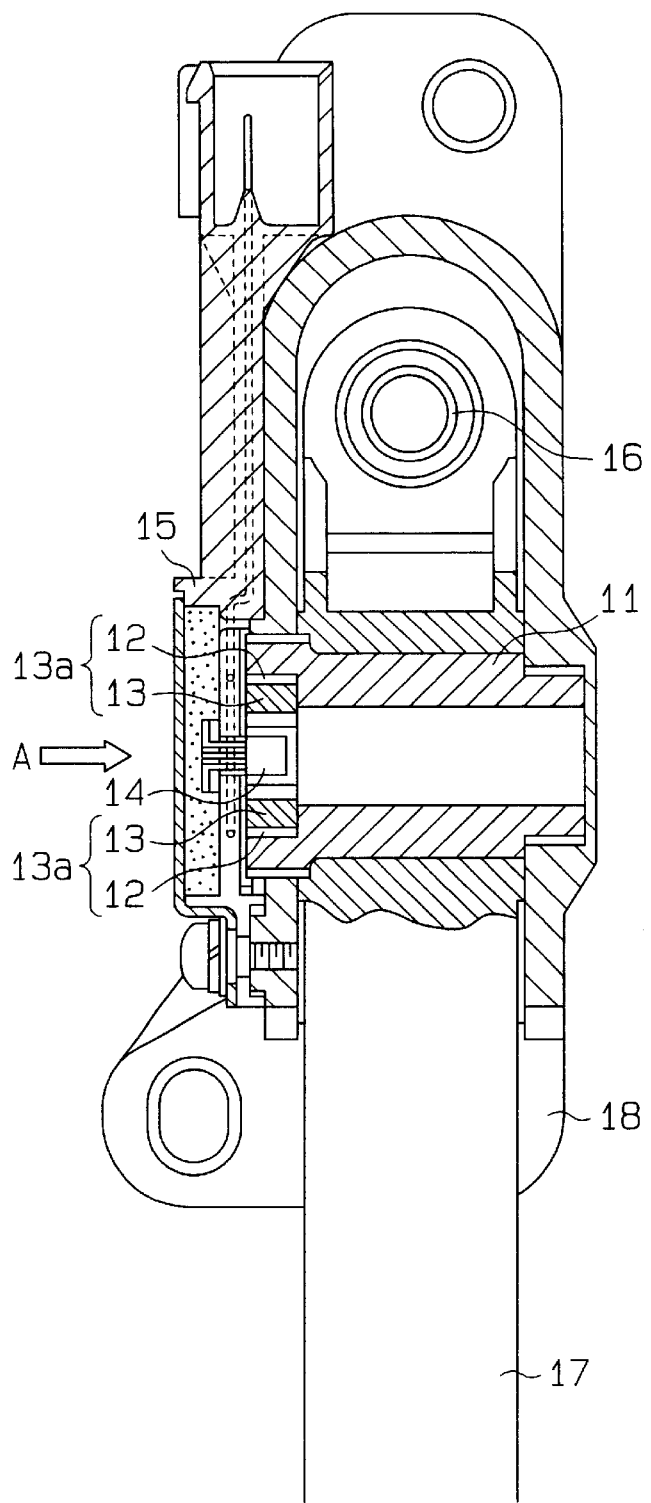
FIG. 6 is a substantially horizontal cross-sectional view illustrating an accelerator sensor embodying the third embodiment, in which the accelerator sensor is incorporated in an accelerator.
Figure 7:
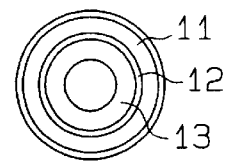
FIG. 7 is a diagram of the rotational shaft illustrated in FIG. 6 viewed in a direction of an arrow A.
Figure 8:
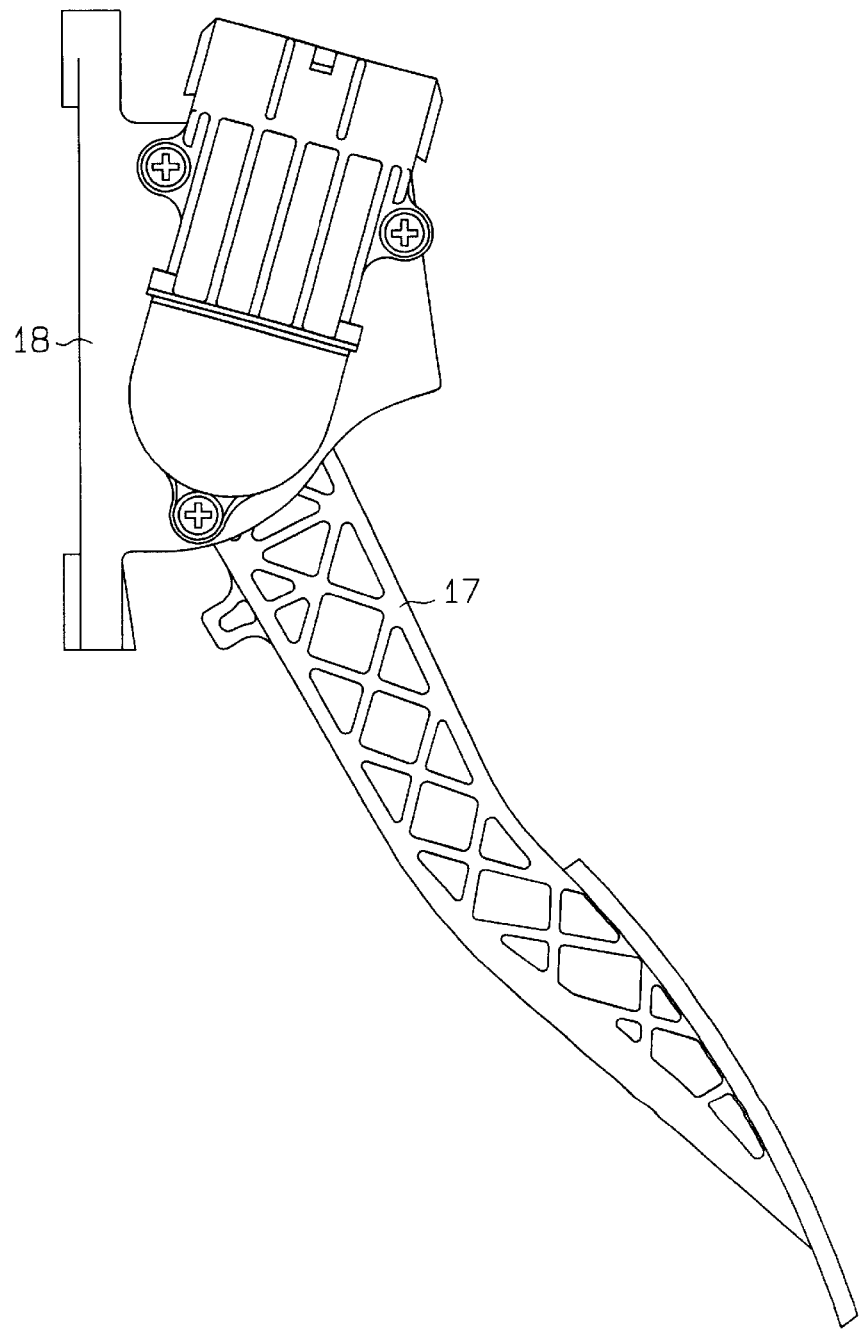
FIG. 8 is a side view of the accelerator FIG. 6.
Figure 9:
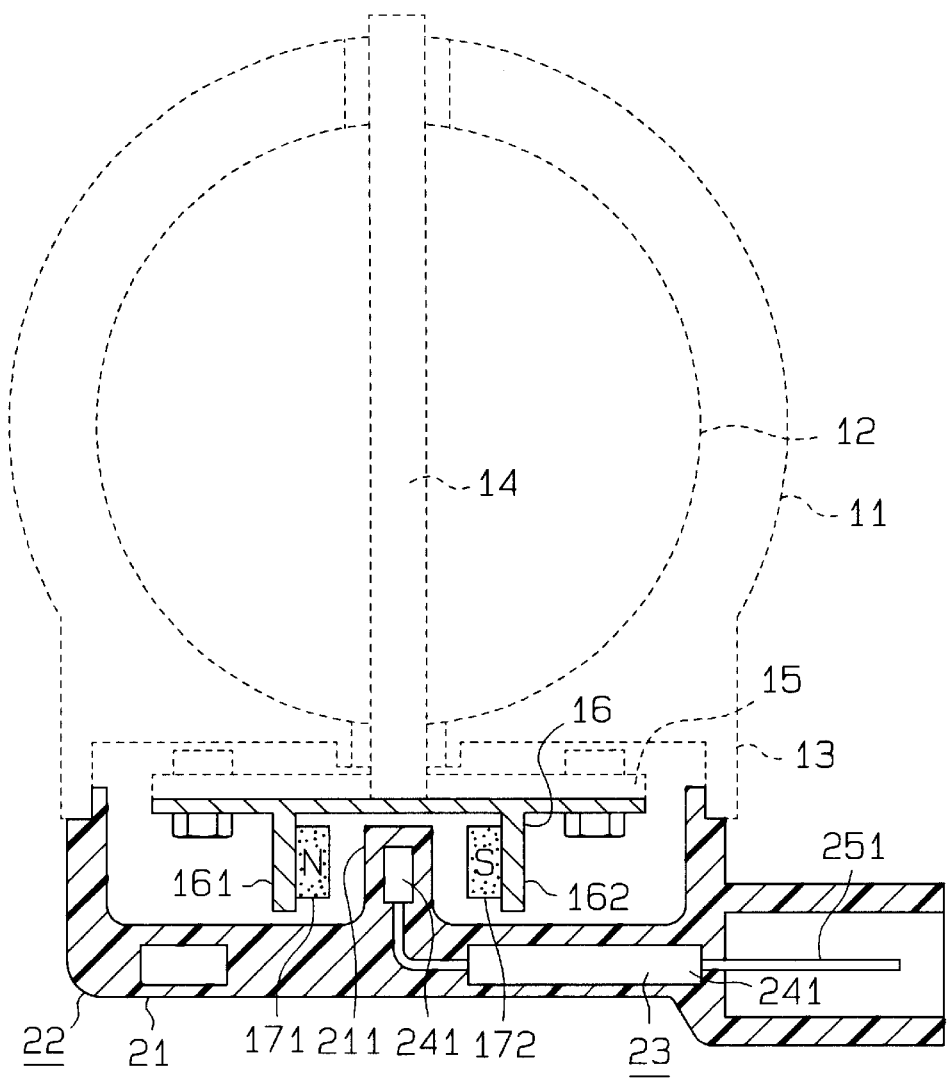
FIG. 9 is a diagram illustrating a displacement sensor related to the displacement sensors of the present invention.
Figure 10:
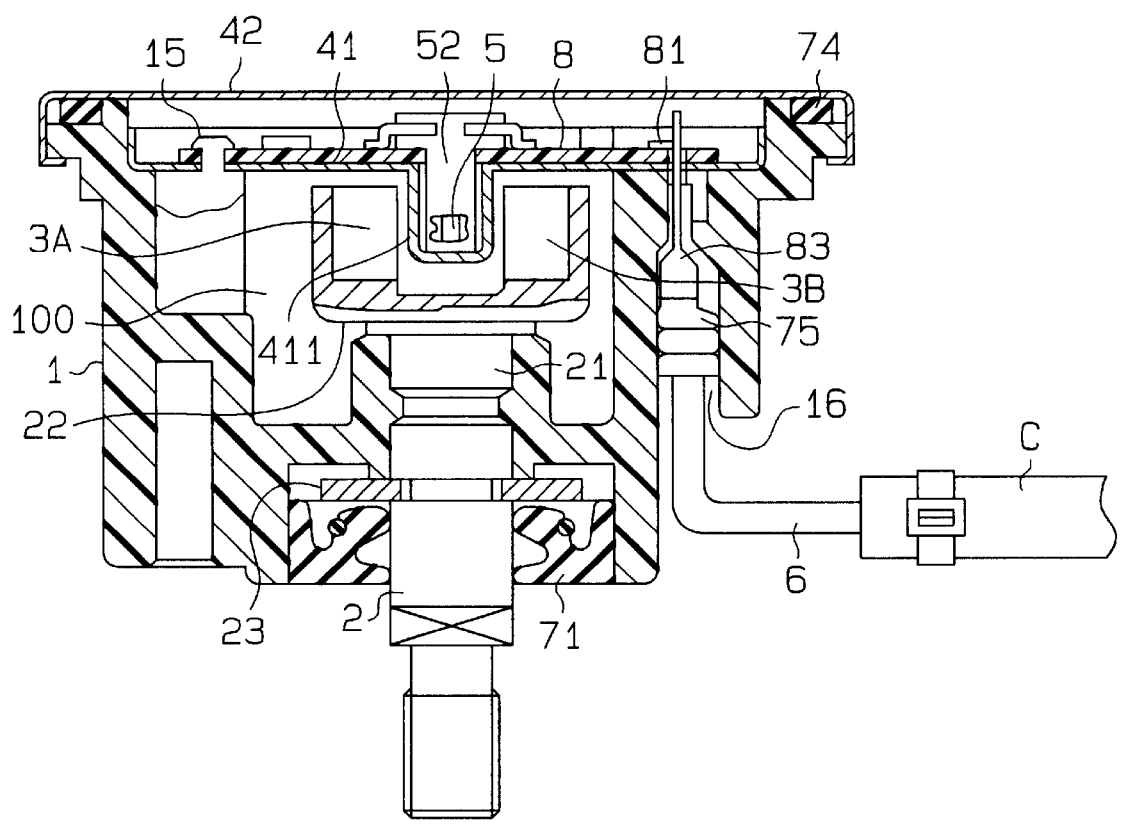
FIG. 10 is a diagram illustrating another displacement sensor related to the displacement sensors of the present invention.

An accelerator sensor embodying the third embodiment is illustrated in FIGS. 6 to 8. A pedal 17 is pivotally supported by an approximately cylindrical hollow rotational shaft 11 and is held by a pedal case 18. The pivotally supported pedal 17 is applied with reaction force from a spring 16 so as to function as an accelerator pedal. A rotational shaft 11 for pivotally supporting the pedal 17 is rotated proportionally to a depressing force applied to the pedal 17. A stepped portion is formed at a tip end portion of the rotational shaft 11, and a magnetic circuit forming member 13a constituted by a yoke 12 and a magnet 13 is disposed at the stopped portion. An inner diameter of the stepped portion is smaller than an outer diameter of a portion of the rotational shaft 11 which pivotally supports the pedal 17. A magnetic field is rotated proportional to the depressing force applied to the pedal 17, as well. A hall element 14 (a magnetic sensing element) is supported by a sensor housing 15 so as not to be displaced at a central portion of the magnetic field. The hall element 14 detects the rotation of the rotation pedal 17, the rotation of the magnetic circuit forming member 13a, and the rotation of the magnetic field so as to output voltage proportional to rotational angle.

As illustrated in FIGS. 6, 7, according to the third embodiment of the present invention, the magnet 13 and the yoke 12 are in the form of an annular structure in their horizontal cross-sections and define the magnetic field having small distortion at a central portion of the annular circle. The magnet 13 and the yoke 12 are not limited to the form of the annular structure in their horizontal cross-sections. The magnet 13 and the yoke 12 can be in the form of square shape, rectangular shape, or any other shapes as far as the magnetic field having little distortion is defined at the central portion where the hole element (the magnetic sensing element) is positioned.

As described above, according to the present invention, the magnetic circuit forming member is disposed in the rotational shaft. The rotational shaft and the magnetic circuit forming member can hence be coaxial with each other with a high level of accuracy. In addition, there is no need to externally attach the magnetic circuit forming member at an end portion of the rotational shaft. A connecting member including a screw is not required. Therefore, the size of the sensor in its width direction can be reduced. Further, there is no dimensional error upon mounting, which would occur due to the components externally attached to the rotational shaft. The magnetic sensing element can hence be located at a central position of the rotational shaft and at a central position of the magnetic circuit forming member, i.e., at a central position of the magnetic field, with a high level of accuracy. Therefore, the rotation of magnetic field, the rotation of rotational shaft, and a displacement amount can be detected with a high level of accuracy.

Further, the magnetic field is defined in the rotational shaft so that the magnetic sensing element is necessarily located in the rotational shaft. Therefore, the size of the displacement sensor can be reduced in the thickness direction.

When the magnet, i.e., the magnetic field is located at an approximately central portion in an axial direction of the rotational shaft, an influence of an external factor including vibration can be reduced to a minimum level. Therefore, the displacement can be detected with a higher level of accuracy.

The rotational shaft is in a hollow shape so that the weight of the rotational shaft can be reduced. Further, the rotational shaft has a large outer diameter so that a grip area for rotating the rotational shaft can hence be enlarged. Therefore, the rotation of the rotational shaft can be controlled by a simple mechanism.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present inventional defined in the claims, be embraced thereby.

What is claimed is:

1. A displacement sensor comprising:

a housing;

a rotational shaft being in an approximately cylindrical hollow shape, the rotational shaft having a shoulder portion formed at an approximately central portion therein in an axial direction;

a magnetic circuit forming member disposed in said shoulder portion of the rotational shaft; and a magnetic sensing element supported by a housing so as to be positioned on a central axis of rotational shaft in a space enclosed by the magnetic circuit forming member, wherein the magnetic sensing element is not displaced.

2. A displacement sensor, according to claim 1, wherein the magnetic circuit forming member is disposed at a stepped portion provided at one end portion of an inner space of the rotational shaft or at an approximately central portion in an axial direction of the inner-space of the rotational shaft.

3. A displacement sensor, according to claim 1, wherein the magnetic circuit forming member is disposed at a stepped portion provided at one end portion of the inner space of the rotational shaft.

4. A displacement sensor, according to claim 1, wherein the magnetic circuit forming member is disposed in said shoulder portion provided at an approximately central portion in an axial direction of the inner space of the rotational shaft.

5. A displacement sensor, according to claim 1, wherein the rotational shaft is made of soft magnetic material.

6. A displacement sensor, according to claim 2, wherein the rotational shaft is made of soft magnetic material.

7. A displacement sensor, according to claim 3, wherein the rotational shaft is made of soft magnetic material.

8. A displacement sensor, according to claim 4, wherein the rotational shaft is made of soft magnetic material.

9. A displacement sensor, according to claim 3, wherein the stepped portion has an inner diameter which is smaller than outer diameters of the other portions of the rotational shaft.

10. A displacement sensor, according to claim 5, wherein the stepped portion has an inner diameter which is smaller than outer diameters of the other portions of the rotational shaft.

11. A displacement sensor, according to claim 1, wherein a space in the inner space of the rotational shaft, except for a space defined by the magnetic circuit forming member or a space defined by a magnet and the housing is in a solid structure.

* * * * *